United States Patent [19]
Grishchenko et al.

[11] Patent Number: 5,993,705
[45] Date of Patent: Nov. 30, 1999

[54] METHODS FOR CONVEYING CONTAINERS THROUGH AN OVEN TO PRODUCE HEAT-INSULATIVE FOAMED LAYERS THERETHROUGH

[75] Inventors: Grigory Grishchenko, River Edge; Walter Malakhow, Teaneck, both of N.J.; Arthur H. Livingston, Saylorsburg, Pa.; Leo W. Gontkosky, North Hampton, Pa.; David C. Brown, Clark Summit, Pa.; Michael A. Breining, Neenah, Wis.

[73] Assignee: Fort James Corporation, Deerfield, Ill.

[21] Appl. No.: 08/865,682

[22] Filed: May 30, 1997

[51] Int. Cl.[6] ........................................ B29C 44/02
[52] U.S. Cl. ................ 264/46.4; 264/69; 264/134; 264/277
[58] Field of Search ................. 264/46.4, 134, 264/277, 69

[56] References Cited

U.S. PATENT DOCUMENTS

| | | | |
|---|---|---|---|
| 3,479,694 | 11/1969 | Winstead | 264/321 |
| 3,703,255 | 11/1972 | Wade | 264/321 |
| 3,792,137 | 2/1974 | Seto | 264/46.4 |
| 3,949,028 | 4/1976 | Murakami et al. | 264/134 |
| 3,970,492 | 7/1976 | Amberg et al. | 264/230 |
| 4,435,344 | 3/1984 | Iloka | 264/45.1 |
| 4,442,064 | 4/1984 | Myers et al. | 264/321 |
| 4,579,275 | 4/1986 | Peelman et al. | 264/321 |
| 5,188,775 | 2/1993 | Hornback et al. | 156/86 |
| 5,326,517 | 7/1994 | Yaita et al. | 264/51 |
| 5,411,689 | 5/1995 | Lee et al. | 264/321 |
| 5,490,631 | 2/1996 | Iloka et al. | 264/46.4 |

FOREIGN PATENT DOCUMENTS

| | | | |
|---|---|---|---|
| 0 161 597 | 11/1985 | European Pat. Off. | 264/134 |
| 61-239935 | 10/1986 | Japan | 264/134 |

*Primary Examiner*—Allan R. Kuhns
*Attorney, Agent, or Firm*—Burn, Doane, Swecker & Mathis, L.L.P.

[57] ABSTRACT

Containers are conveyed through an oven on a conveyor to cause a foamable material on each container to foam and become a heat insulative layer. The containers are supported on respective holders of the conveyor, which prevent the containers from contacting one another. Preferably, the holders support the containers loosely, to enable the containers to wobble relative to the holders under the influence of oven air currents and conveyor vibration. The holders thus do not make contact with any given point on their respective containers for a time period that is sufficient to enable the holders to draw enough heat away from the container to adversely affect the foaming operation. The containers are conveyed in single file, along a serpentine path through the oven.

15 Claims, 4 Drawing Sheets

METHODS FOR CONVEYING CONTAINERS THROUGH AN OVEN TO PRODUCE HEAT-INSULATIVE FOAMED LAYERS THERETHROUGH

BACKGROUND OF THE INVENTION

The invention relates to methods and apparatus for making a heat-insulating paper container having a foamed layer on at least one surface thereof. More particularly, the invention relates to methods and apparatus for conveying a container through an oven to produce a foamed layer.

Disclosed in U.S. Pat. Nos. 4,435,344 and 5,490,631 (the disclosures of which are incorporated by reference herein in their entirety) is a heat-insulating paper container comprising a side body and a bottom panel member, characterized in that at least one surface of the side body is coated or laminated with a foamed heat-insulating layer of a thermoplastic synthetic resin film.

FIG. 5 is a simplified cross section of an example of such a prior art heat-insulating paper container 1. The container 1 comprises basically a paper sheet forming a side body 3 and a bottom panel member 5. The side body 3 has a foamed heat-insulating layer 11 which entirely covers its outer surface and which may typically be formed of a thermoplastic synthetic resin such as polyethylene.

The inner surface of the side body 3 is covered with a film 13 which is made of either a thermoplastic synthetic resin such as polyethylene, or an aluminum foil. The inner surface of the bottom panel member 5 is laminated with a thermoplastic synthetic resin film 15.

The heat-insulating container 1 is fabricated by means of a cup-forming machine (not shown). First, the outer surface of a paper sheet is extrusion-laminated with a film of thermoplastic synthetic resin such as polyethylene. The inner surface of the paper sheet is also laminated with a thermoplastic synthetic resin film or an aluminum foil. A paper sheet for making the bottom panel member is laminated with a thermoplastic synthetic resin film on one side only. A blank is cut from each of the paper sheets. Using a conventional cup-forming machine, the two blanks are fabricated into a container, with the blank or the bottom panel member oriented in such a way that the film laminated side faces inward. The thus-fabricated untreated container is then subjected to a heat treatment in order to cause moisture in the paper to vaporize. For instance, the untreated containers can be heated at 120° C. for 120 seconds.

According to U.S. Pat. No. 4,435,344 (column 4, lines 5–11), the containers may be heat-treated by being conveyed through an oven. The conveyance of the containers through the oven may be performed by laying the containers en masse onto a conveyor belt, the containers could be disposed right side up, but in order to achieve maximum cup stability, the cups would preferably be in an inverted state, i.e., supported on their larger-diameter rims. Nevertheless, as the containers pass through the oven, they would be subjected to air currents and conveyor vibrations which would cause the very light-weight containers to be displaced against one another, whereby they can become stuck together. Some containers may be displaced to such an extent that they fall over, whereby jams can occur during conveyance.

Furthermore, it is desirable that all of the containers be subjected to essentially the same treatment in the oven, in order that the foaming action be uniform from one container to another. However, the heating chamber of a typical oven does not establish uniform conditions. That is, in one region of the heating chamber the temperature and/or air current may be different from those of another region. If the containers are being fed through the oven along separate paths (e.g., containers seated on respective opposite sides of the conveyor belt will travel along paths that are laterally spaced from one another), the foaming action may not occur uniformly from one container to another. In an attempt to alleviate that problem, multi-zone ovens have been designed which establish zones of mutually different treatment characteristics, e.g., the temperature, direction of heat flow, and/or direction of air current may intentionally be varied from one zone to another, in an effort to make the overall treatment more uniform among the containers. However, such multi-zone ovens may not adequately achieve that goal and may be more expensive and/or difficult to construct.

SUMMARY OF THE INVENTION

The present invention relates to methods and apparatus for producing heat-insulating composite paper containers. The method involves providing fabricated containers. Preferably, each is comprised of a side body and a bottom panel. At least a portion of each container is formed of paper and is provided on at least one surface with a foamable material to define a foamable area of the container. The fabricated containers are conveyed through an oven while being supported on a conveyor, to heat the fabricated containers at a temperature and time period sufficient to cause the foamable material to foam under the action of moisture released from the paper. During conveyance through the oven, each of the fabricated containers is supported on the conveyor in a manner preventing appreciable heat from being drawn from the foamable area by the conveyor, while preventing each fabricated container from making contact with any other fabricated container within the oven.

Preferably, the containers are mounted on respective holders of the conveyor and are permitted to freely wobble relative to their respective holders in a manner preventing each of the holders from making continuous contact with any given point on the foamable area of a respective fabricated container during an entire residence period of the fabricated container in the oven.

Each of the fabricated containers is preferably supported in an inverted state with an upstanding portion of its respective holder extending upwardly through a mouth of the fabricated container.

The apparatus aspect of the invention comprises an oven producing currents of heated air, and a conveyor for conveying a plurality of fabricated containers through the oven to cause a foamable material to foam on at least one surface of each fabricated container. The conveyor includes a plurality of spaced apart holders for supporting respective fabricated containers. Each holder is configured for supporting its respective fabricated container in a loose manner, enabling the fabricated container to freely wobble relative to its holder under the influence of conveyor vibration and/or the air currents within the oven, while preventing the fabricated container from making contact with any other fabricated container within the oven.

Preferably, each of the holders supports its respective container in a substantially vertical orientation and includes an upstanding portion extending through a mouth of a respective fabricated container.

Each container can be supported on its bottom panel, or on its rim which surrounds the mouth.

BRIEF DESCRIPTION OF THE DRAWING

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 5:
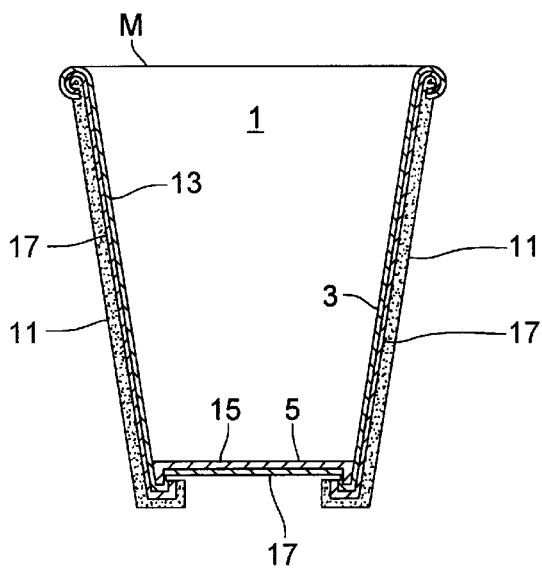
FIG. 5 is a vertical sectional view through a prior art container.

The present invention can be utilized to make a container that is identical to or generally similar to that depicted in FIG. 5. It will be appreciated that the steps leading up to the heat treatment may be varied within the scope of the invention, as long as the container which is heat treated has a foamable material on an area thereof, preferably on its outer side surface. By "foamable" is meant any material which is foamable under the action of moisture released from the paper of the container while passing through an oven. Suitable materials include, but are not limited to, thermoplastic synthetic resin films such as polyethylene, polypropylene, polyvinylchloride, polystyrene, polyester, nylon, and the like.

The oven can produce heat in any suitable fashion, e.g., by hot air, electric resistance heaters, microwaves, etc. In order to maintain a uniform temperature within the chamber, air currents are established. For example, generally circular currents can be established whereby each current travels downwardly at a center of a width of the chamber, then horizontally outwardly to a respective side of the chamber, then upwardly along that side and back to the center.

As explained earlier, air currents and/or conveyor vibration have heretofore produced displacement of containers conveyed through the oven while seated loosely on a conveyor belt, such that the containers may contact one another and stick together, or fall over and cause jams along the conveyance route.

In accordance with the present invention, however, conveying methods and apparatus are provided to ensure that containers are conveyed through an oven such that the containers do not fall over or that foamable areas of the containers do not contact foamable areas of other containers, and wherein the foamable areas foam properly, i.e., no appreciable heat is drawn from the foamable areas by the conveyor. The "foamable area" includes the foaming substance itself as well as the portion of the paper on which the foaming substance is disposed. A conveyor 24 on which the containers C are supported comprises an endless chain 25 to which are connected container holders in the form of upstanding elements 26. Each upstanding element 26 includes a vertical post 28 affixed to the chain 25, and a container supporting section 30. The container supporting section 30 comprises a center disk 32 and a plurality of rods 34 projecting downwardly from the disk 32. The disk 32 includes a center hole in which an upper end of the post 28 is fixed. There are preferably at least three rods 34 and they extend downwardly at an inclination with respect to vertical whereby the lower ends 36 of the rods are disposed horizontally outwardly with respect to the upper ends thereof.

Figure 6A:
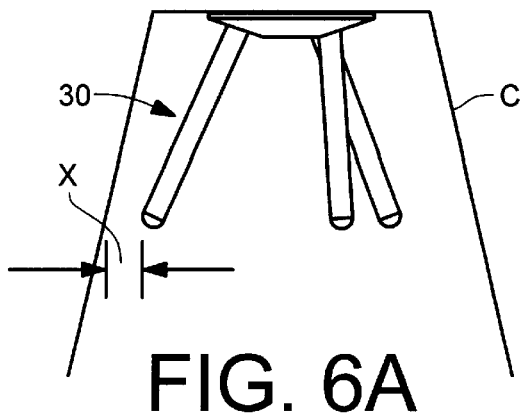
FIGS. 6A, 6B, and 6C are schematic views depicting various ways in which a container can shift and wobble on its respective holder.
Figure 6B:
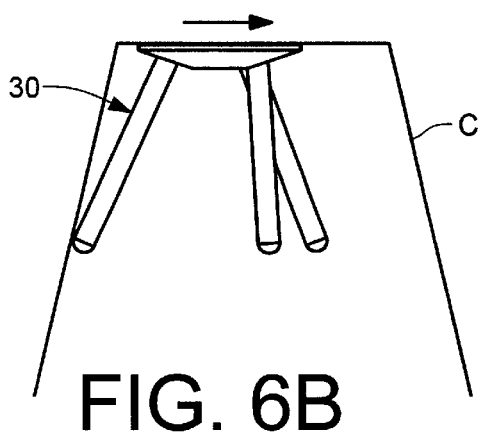
Figure 6C:
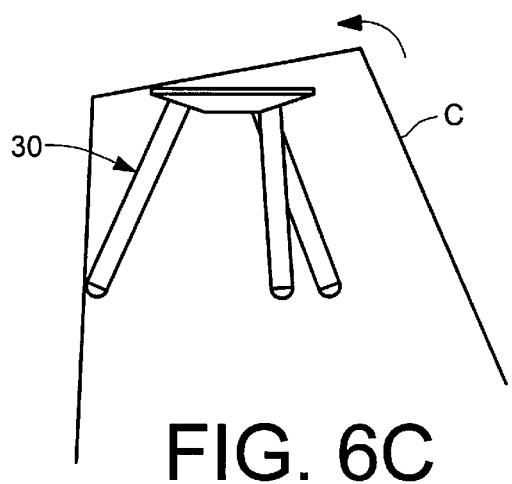

When a container in a vertical, but inverted, state is inserted downwardly upon the holder 30, e.g., by being dispensed from a delivery tube 36, the holder 30 extends through a mouth M of the container, and the inside surface of the bottom panel 5 comes to rest on the disk 32 as shown in FIG. 6A. Preferably the disk is recessed downwardly so that the bottom panel 5 makes line contact with an outer edge 38 of the disk, rather than making surface contact therewith. A diameter of the inner surface of the container C is larger than an outer diameter of the disk, and the lower ends of the rods 34 lie on an imaginary circle 35 whose diameter is less than a diameter of the container located at the same elevation as the circle. Therefore, if the longitudinal axis of the container were to exactly coincide with a longitudinal axis of the holder 30 (i.e., if it were to coincide with the axis of the post 28), then the lower ends of each of the rods would be spaced radially inwardly from the inner surface of the container by a distance x (see FIG. 6A). This assures that the container can never be snugly wedged against the rods. It will also be appreciated that the container is free to move in any direction relative to the holder 30, except vertically downwardly. Thus, the container could move horizontally relative to the holder as shown in FIG. 6B, or slightly upwardly relative to the holder (not shown), or the container can tilt about the disk edge 38 acting as a fulcrum as shown in FIG. 6C. In each case of horizontal shifting or tilting, the extent of travel of the container will be limited by contact with one of the rods 34. The extent of travel is designed to ensure that adjacently located containers on the conveyor can never contact one another even if they have moved toward one another by a maximum permissible amount.

The holder 30 is formed of any suitable heat-resistant material, such as stainless steel. The post 28 and rods 34 can be affixed to the disk 32 in any appropriate fashion, e.g., by welding.

The characteristics of the oven and conveying mechanism which have given rise to problems in the prior art, namely conveyor vibration and air currents, are utilized by the present invention to achieve a substantial benefit. That is, while the individual holders 26 could reasonably be expected to keep the containers apart, there was a concern that the holders would function as heat sinks and would draw heat away from points of the container which made continuous contact with the holder, thereby preventing a proper foaming action from taking place at those contact points. In practice, however, by designing the holder so that it supports the container in a loose manner, the container is free to continuously wobble under the influence of the conveyor vibration and air currents, whereby the holder will not make continuous contact with any given point on the side body of the container. In fact, the holder will not make continuous contact with any point on the container, so it is possible to produce proper foaming not only on the side body, but also on the bottom panel, if desired.

Figure 7:
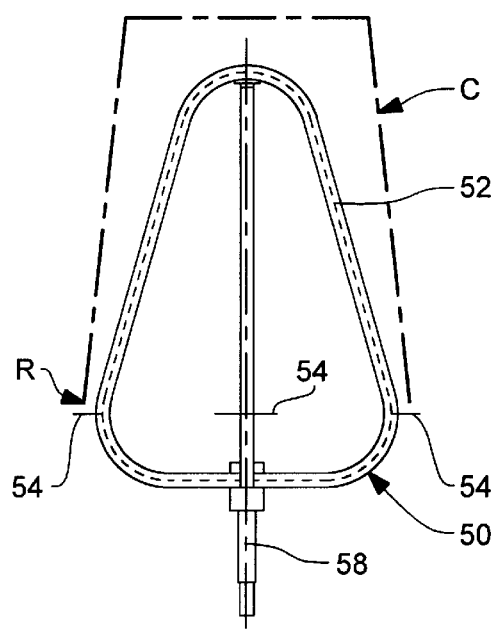
FIG. 7 is a side elevational view of a second embodiment of a container holder according to the present invention.
Figure 8:
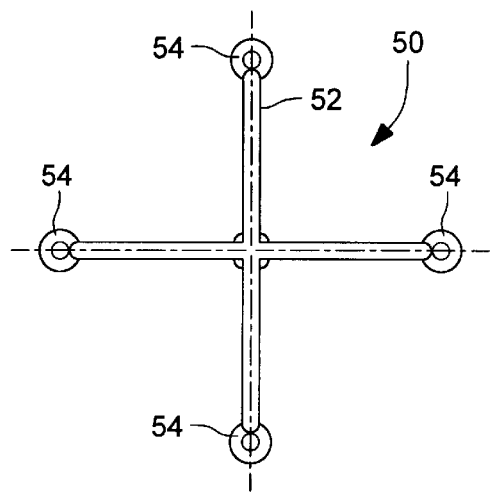
FIG. 8 is a top plan view of the holder depicted in FIG. 7.

It will be appreciated that the depicted configuration of the holder 30 represents one of many possible configurations of a holder which would achieve the objects of the present invention. Another possible configuration is shown in FIGS. 7 and 8 wherein a holder 50 includes a series of rods 52 which converge upwardly. At their lower ends, the rods 52 carry horizontal shoulders 54 upon which a rim R of a container can rest, such that the bottom panel of the container is spaced above an upper end of the holder, and the side body of the container is spaced from the rods 52. The holder is secured to the conveyor chain 25 by a post 58. This design offers the advantage that the primary region of support for the container, namely its rim R, is not subject to a foaming action, so that an appreciable period of contact between the rim and the shoulders will not have an adverse affect on the foaming operation. As in the previous embodiment, the rods 52 will limit any horizontal movement of the container relative to the holder, to prevent adjacent containers from contacting one another in the oven.

Figure 1:
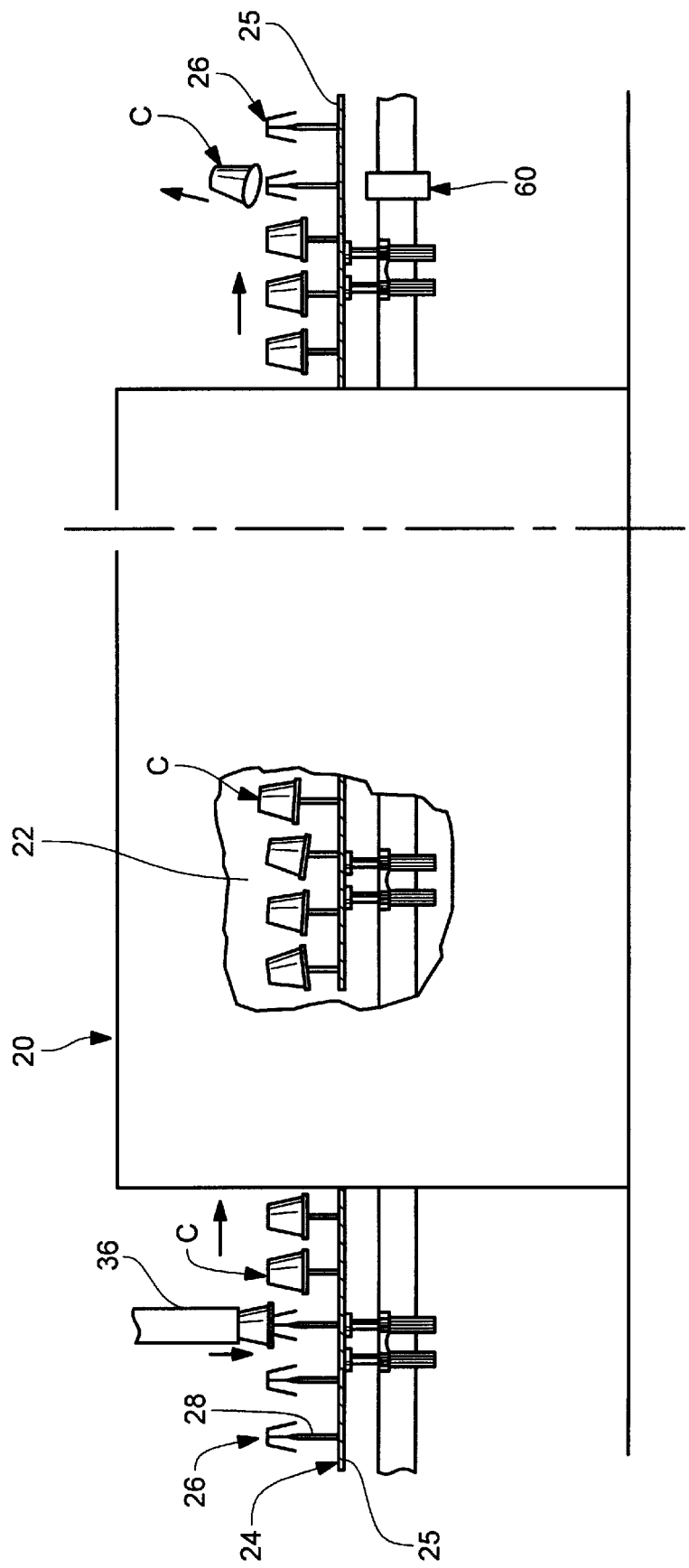
FIG. 1 is a side elevational view of an oven and a conveying mechanism according to the present invention, with a portion of a side wall of the oven being broken away.
Figure 2:
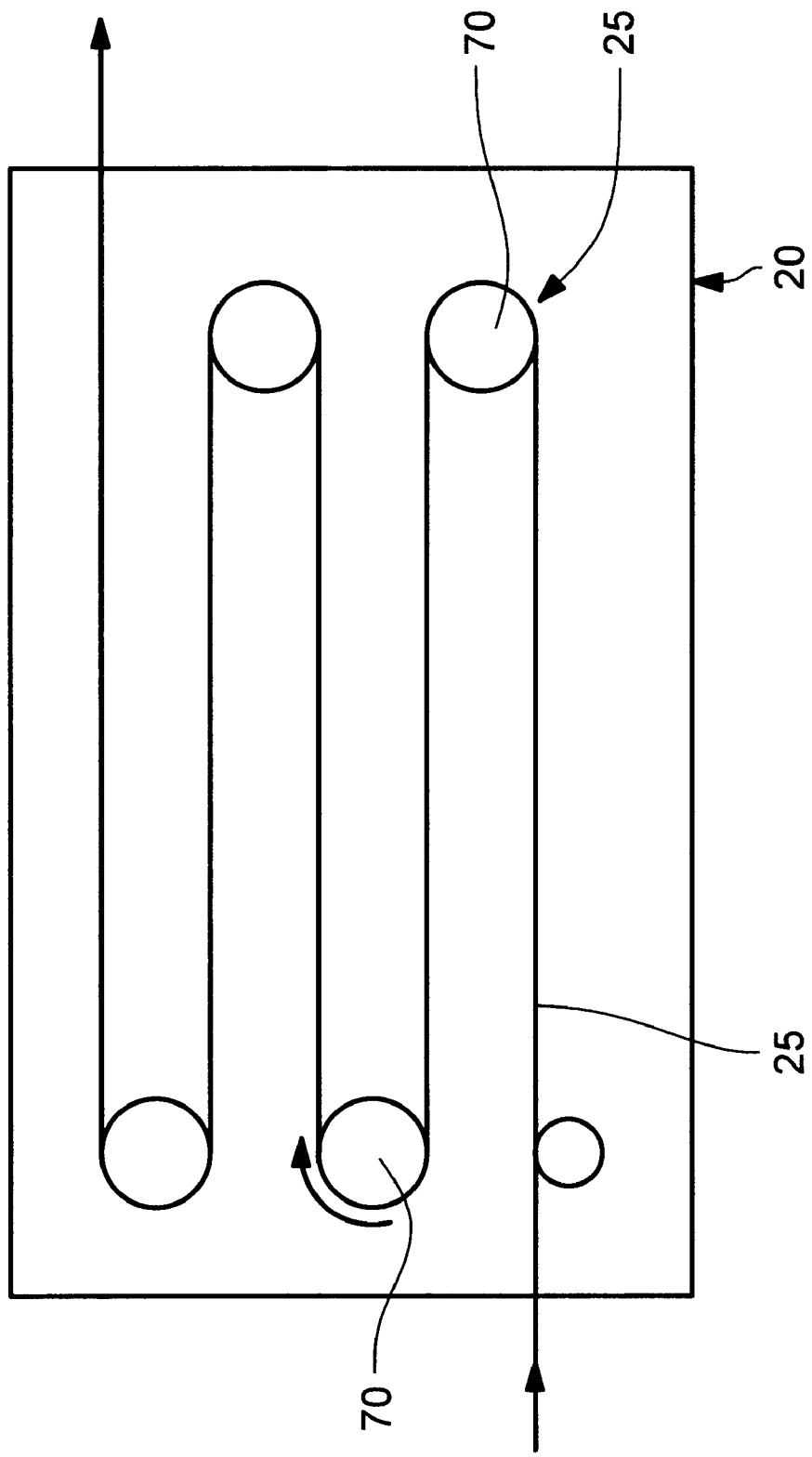
FIG. 2 is a schematic top plan view of the oven depicted in FIG. 1 depicting a serpentine travel path of the conveyor chain therethrough.
Figure 3:
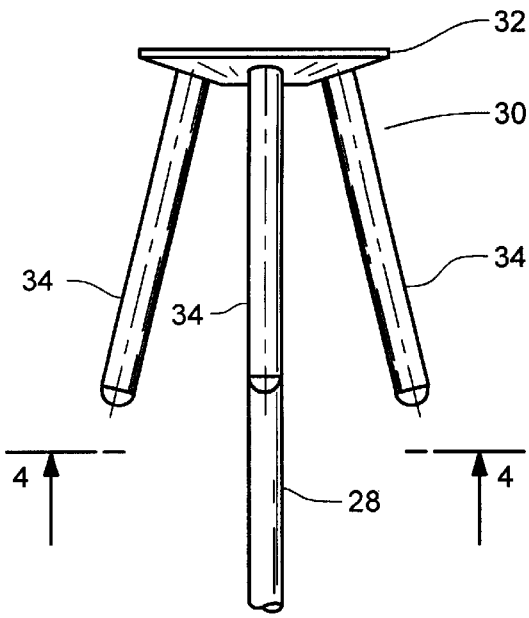
FIG. 3 is a side-elevational view of a first embodiment of a container holder according to the present invention.
Figure 4:
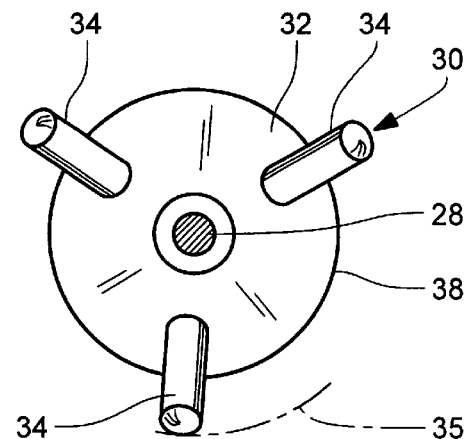
FIG. 4 is a sectional view taken along the line 4—4 in FIG. 3.

The containers are preferably conveyed through the oven in a single-file serpentine path, passing around rotary sprockets 70, as depicted in FIGS. 1 and 2. Thus, all of the containers travel along the same path of travel through the heating chamber and will be subjected to virtually identical conditions (e.g., temperature and air flow conditions), regardless of whether conditions in some regions of the heating chamber are different from those in other regions thereof. Accordingly, the foaming action occurs uniformly from one container to another, without the need to resort to a special multi-zone oven. Also, the advantageous wobbling of the containers is promoted as the containers travel around the corners formed by the serpentine path. The serpentine travel path serves to establish a sufficient residence period for the containers within the oven, while minimizing the required length of the oven.

Of course, the provision of a serpentine path is optional. Any travel path could be employed which results in sufficient heating of the containers. For instance the travel path could be straight, with the oven being long enough to achieve sufficient heating.

Once the containers have exited the oven, they are ejected from the conveyor chain 25 by a suitable mechanism, such as a blower 60 which emits an upward stream of air that lifts the container off its holder, as shown in FIG. 1.

In accordance with the present invention, containers can be subjected to a foaming action within an oven, without risk that the containers will contact one another, or will cause jams in the conveying line. Hence, the number of containers that must be sent to waste is reduced, and the need for an operator to shut down a conveying operation and enter an oven in order to deal with container jams is eliminated. Also, the foaming action occurs uniformly from one container to another, avoiding the need to resort to a special multi-zone oven.

While the above-discussed preferred embodiments accomplish that result by means of a controlled wobbling of the containers, it will be appreciated that other types of mechanisms could be utilized. For example, the conveyor could include holders in the form of clamps which engage non-foamable areas of the containers, such as the container bottoms or the container rims. Such clamps would hold the containers stationary relative to the conveyor, with the clamps disposed in spaced relationship to the foamable areas. In lieu of clamps, suction devices could be employed. That is, the conveyor could include vertical posts each of which has an upper end on which rests a surface of a container bottom. The post would be hollow so that a negative pressure could be conveyed to the upper end of the post to suction the container bottom to the post. The container would thereby be fixed to the post, with the foamable areas spaced from the post.

Alternatively, the conveyor could include holders which are disposed in continuous (i.e., non-wobbling) contact with foamable or non-foamable areas thereon, but wherein the holders are formed of a low heat transmitting material which does not conduct an appreciable amount of heat from the foamable areas.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed:

1. A method of producing heat-insulating composite paper containers comprising the steps of:
   A) providing fabricated containers, each comprised of a side body and a bottom panel, at least a portion of each container formed of paper provided on an area thereof with a foamable material to define a foamable area of the container;
   B) conveying the fabricated containers through an oven while supported on a conveyor, to heat the fabricated containers at a temperature and time period sufficient to cause the foamable material to foam under the action of moisture released from the paper; and
   C) supporting each of the fabricated containers on the conveyor during step B, in a manner preventing appreciable heat from being drawn from the foamable area by the conveyor, while constraining each fabricated container from making contact with any other fabricated container within the oven.

2. The method according to claim 1 wherein step C comprises supporting the fabricated containers on respective holders of the conveyor while causing the containers to freely wobble with respect to their respective holders.

3. A method of producing heat-insulating composite paper containers comprising the steps of:
   A) providing fabricated containers, wherein at least one surface thereof is provided with a foamable material;
   B) conveying the fabricated containers through an oven while supported on a conveyor, to heat the fabricated containers at a temperature and time period sufficient to cause the foamable material to foam under the action of moisture released from the fabricated container; and
   C) supporting each of the fabricated containers on the conveyor during step B, by a respective holder of the conveyor, the holder supporting the respective fabricated container in a loose manner, enabling the fabricated container to freely wobble relative to its holder under the influence of conveyor vibration and air currents occurring within the oven, while preventing the fabricated container from making contact with any other fabricated container within the oven.

4. The method according to claim 3 wherein step C includes supporting each container in a substantially vertical orientation.

5. The method according to claim 3 wherein step C further comprises permitting the fabricated containers to freely wobble relative to their respective holders in a manner preventing each of the holders from making continuous contact with any given point on the respective fabricated container for an entire residence period of the fabricated container in the oven.

6. The method according to claim 3 wherein step C further comprises supporting each of the fabricated containers on its respective holder such that an upstanding portion of each holder extends through a mouth of a respective fabricated container.

7. The method according to claim 6 wherein step C further comprises supporting each of the fabricated containers in an inverted state, with the upstanding portion of the holder extending upwardly through the mouth of the fabricated container.

8. The method according to claim 7 wherein each fabricated container comprises a bottom panel and step C further comprises supporting the bottom panel of each of the fabricated containers on an upper end of the upstanding portion of the holder.

9. The method according to claim 7 wherein step C further comprises restricting horizontal movements of the mouth of each of the fabricated containers by a lower region of the upstanding portion.

10. The method according to claim 7 wherein step C further comprises supporting a rim of the mouth of each of the fabricated containers on a generally horizontal shoulder portion of the respective holder.

11. The method according to claim 3 wherein step A further comprises providing an inner surface of each container with a non-foamable material.

12. The method according to claim 11 wherein step A further comprises providing an inner surface of a bottom panel of each fabricated container with a non-foamable material.

13. The method according to claim 3 wherein step B further comprises conveying the fabricated containers in single file, along a serpentine path through the oven.

14. A method of producing heat-insulating composite paper containers comprising the steps of:

A) providing fabricated containers, each comprised of a side body and a bottom panel, at least a portion of each container formed of paper provided on an area thereof with a foamable material to define a foamable area of the container;

B) conveying the fabricated containers through an oven while supported on a conveyor, to heat the fabricated containers at a temperature and time period sufficient to cause the foamable material to foam under the action of moisture released from the paper; and C) supporting each of the fabricated containers on the conveyor during step B, in a manner preventing appreciable heat from being drawn from the foamable area by the conveyor, while constraining each fabricated container from making contact with any other fabricated container within the oven, wherein the supporting and constraining is performed with open ends of the containers facing generally downwardly.

15. A method of producing heat-insulating composite paper containers comprising the steps of:

A) providing fabricated containers, each comprised of a side body and a bottom panel, at least a portion of each container formed of paper provided on an area thereof with a foamable material to define a foamable area of the container;

B) conveying the fabricated containers through an oven while supported on a conveyor, to heat the fabricated containers at a temperature and time period sufficient to cause the foamable material to foam under the action of moisture released from the paper; and C) supporting each of the fabricated containers on respective holders of the container while causing the containers to freely wobble with respect to their respective holders, in a manner preventing appreciable heat from being drawn from the foamable area by the conveyor, while preventing a fabricated container from making contact with any other fabricated container within the oven.

* * * * *